May 27, 1924.
J. H. WAGENHORST
COMBINED CONNECTING PLATE AND DRIVER
Filed June 30, 1921
1,495,213
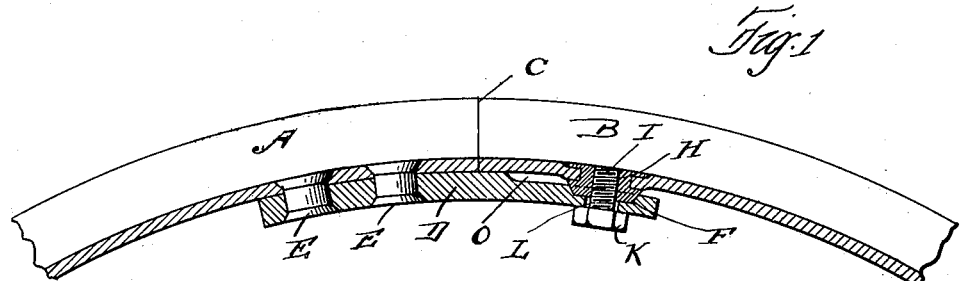
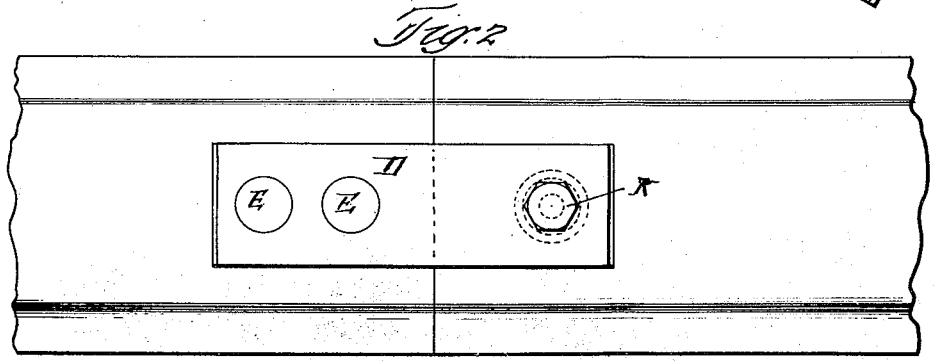
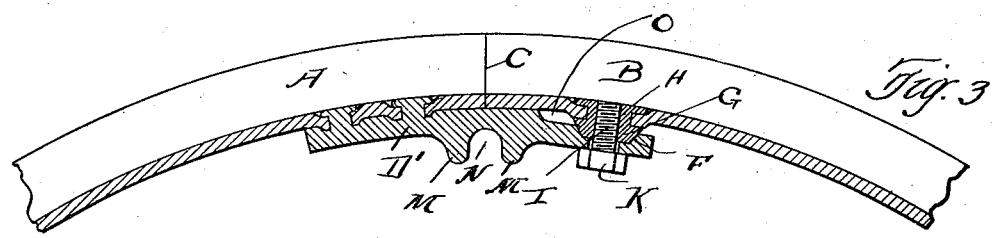
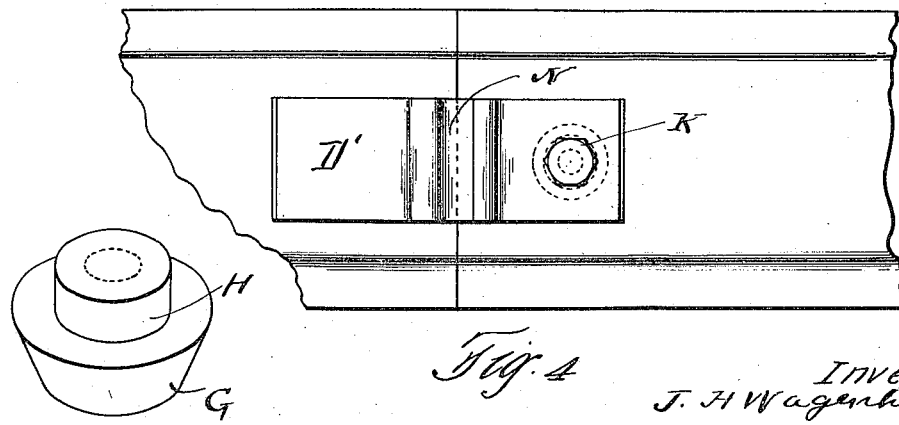
Inventor
J. H Wagenhorst.
By
Hull Brock & West
Attys.

Patented May 27, 1924.

1,495,213

UNITED STATES PATENT OFFICE.

JAMES H. WAGENHORST, OF JACKSON, MICHIGAN.

COMBINED CONNECTING PLATE AND DRIVER.

Application filed June 30, 1921. Serial No. 481,557.

*To all whom it may concern:*

Be it known that I, JAMES H. WAGENHORST, a citizen of the United States, residing at Jackson, in the county of Jackson and State of Michigan, have invented a certain new and useful Improvement in Combined Connecting Plates and Drivers, of which the following is a full, clear, and exact description, reference being had to the accompanying drawings.

This invention relates generally to automobile rims of the transplit type and more particularly to a connecting plate for uniting the ends of said rim. The object of the invention is to provide a simple and efficient form of connecting plate of such construction that when the various parts are properly assembled and fastened together the ends of the rim will be drawn up into proper and exact alignment both laterally and radially, and another object of the invention is to provide a connecting plate having these characteristic features which can also be utilized as a driving connection between the rim and felly.

With these objects in view the invention consists in the novel features of construction and combination, all of which will be fully described hereinafter and pointed out in the appended claims. In the drawing forming a part of this specification, Fig. 1 is a sectional view of a connecting plate and means for fastening the same; Fig. 2 is an inverted plan view of the same; Fig. 3 is a sectional view of a slight modification; and Fig. 4 is an inverted plan view of said modified form; and Fig. 5 is an enlarged detail perspective view of the lug carried by one end of the rim. Referring to the drawings, A indicates one end of the rim, B the opposite end of the rim, and C the line of division. D indicates a connecting plate rigidly secured to the end A by means of rivets E, said connecting plate projecting beyond the dividing line C and recessed as indicated at F to receive the tapered end G of a stud H which is riveted to the end B of the rim as most clearly shown. This stud H is bored centrally and threaded to receive the bolt I having the head K, the free end of the connecting plate having an opening L in addition to the recess F for the passage of the bolt I. The end of the stud being tapered as shown at G and the recess F being correspondingly tapered, it is obvious that when the bolt I is passed through the opening L into the threaded bore of the stud H that the free end of the plate and the inwardly projecting stud will be drawn together and the tapered end of the stud brought into the tapered recess and all of the parts securely bound together and when the plate and stud are thus locked together the ends of the rim must necessarily be properly aligned both radially and laterally and practice has demonstrated the fact that through the medium of the headed bolt I the rim end B can be readily and easily brought into proper locked position. In Fig. 3 I have shown a slightly modified form of connecting plate D' which is securely riveted to the end of the rim A and projects beyond the dividing line C and has the same form of recess F to engage the tapered end G of the stud H and the same form of headed screw I is employed for drawing and locking the parts together. The connecting plate, however, is formed with inwardly projecting parallel bosses M providing a transverse recess N therebetween which straddles or receives one of the transverse felly bolts (not shown) and thereby provides a driving connection between the rim and felly inasmuch as the transverse bolt is carried by the felly and the connecting plate is rigidly attached to the rim.

In practice I also prefer to reduce the free end of the plate slightly upon the outer side thereof in order to provide a space O between the connecting plate and the base of rim and into which a suitable tool can be inserted for the purpose of disengaging the plate from the lug as the bolt has been removed.

It will thus be seen that I provide a simple and efficient construction of connecting plate whereby the ends of the rim are locked together in proper alignment and it will also be seen that in connection with these locking features the driving plate can be provided with means for providing a driving connection between the rim and wheel body.

Having thus described my invention, what I claim is:

1. The combination with a transplit rim, of a connecting plate attached to one end of said rim and projecting beyond said split, the portion of said plate projecting beyond said split having a socket therein, a lug attached to the opposite end of said rim and adapted to be seated in the socket formed in the free end of said connecting plate, and means passing through the connecting plate into the lug for holding said parts together.

2. The combination with a transplit rim, of a connecting plate attached to one end of said rim and projecting beyond the split, the free end of said plate being provided with a conical recess, and a lug attached to the other end of said rim and adapted to seat in said recess, and means for connecting said lug and plate.

3. The combination with a transplit rim, of a connecting plate attached to one end of the rim and projecting beyond the split, the free end of said plate being apertured and recessed, a lug attached to the opposite end of the rim, said lug being adapted to seat in said recess and prevent lateral and longitudinal displacement of said rim ends, and a bolt passing through the connecting plate and threaded into the lug.

4. The combination with a transplit rim, of a connecting plate attached to one end of said rim and projecting beyond said split, the free end of said plate having a tapering recess and an aperture communicating with said recess, and a lug having a tapered portion adapted to fit in said recess, said lug having a threaded bore and a bolt passing through the apertured end of the plate and threaded into said lug and adapted to hold the tapered portion of the lug in the tapered recess of the plate.

5. The combination with a transplit rim, of a connecting plate attached to one end of said rim and projecting beyond said split, a lug attached to the opposite end of said rim, and detachable means for connecting the free end of said plate to said lug whereby the ends of said rim are held against transverse and longitudinal displacement, said plate having a transverse bolt receiving recess intermediate its ends.

6. A transplit rim having an inwardly extending lug on one end and a plate attached to the opposite end of the rim and extending beyond the split, said plate having a socket in the outer face thereof adapted to receive the inwardly projecting lug, said lug having a threaded bore, and a screw passing through an aperture in the socket end of the plate and engaging the threaded bore of the lug.

In testimony whereof, I hereunto affix my signature.

JAMES H. WAGENHORST.